(12) United States Patent
Shin et al.

(10) Patent No.: US 8,507,053 B2
(45) Date of Patent: Aug. 13, 2013

(54) SEALANT AND LIQUID CRYSTAL DISPLAY USING THE SAME

(75) Inventors: Ki-Chul Shin, Seongnam-si (KR); Yeon-Sik Ham, Suwon-si (KR); Da-Hye Cho, Goyang-si (KR)

(73) Assignee: Samsung Display Co., Ltd. (KR)

( * ) Notice: Subject to any disclaimer, the term of this patent is extended or adjusted under 35 U.S.C. 154(b) by 1149 days.

(21) Appl. No.: 11/904,386

(22) Filed: Sep. 26, 2007

(65) Prior Publication Data

US 2008/0079891 A1    Apr. 3, 2008

(30) Foreign Application Priority Data

Sep. 26, 2006 (KR) ................. 2006-093627

(51) Int. Cl.
*G02F 1/1339* (2006.01)
*C08L 63/00* (2006.01)
*B32B 7/12* (2006.01)
*C09J 167/07* (2006.01)

(52) U.S. Cl.
USPC .......... 428/1.54; 428/1.53; 428/355 AC; 428/355 EP; 349/153; 522/101

(58) Field of Classification Search
USPC ............ 428/1.53–1.54, 355 AC, 355 EP, 428/355 N; 349/122, 153; 522/101
See application file for complete search history.

(56) References Cited

U.S. PATENT DOCUMENTS

| | | | | |
|---|---|---|---|---|
| 3,373,075 A | * | 3/1968 | Fekete et al. ............ | 442/136 |
| 4,061,845 A | * | 12/1977 | Fabris et al. ............ | 528/367 |
| 4,578,425 A | * | 3/1986 | Santorelli ................ | 525/109 |
| 4,612,209 A | * | 9/1986 | Forgo et al. ............. | 427/516 |
| 4,666,951 A | * | 5/1987 | Onishi et al. ............ | 522/8 |
| 4,959,398 A | * | 9/1990 | Oka et al. ............... | 523/400 |
| 4,975,471 A | * | 12/1990 | Hayase et al. ........... | 522/13 |
| 5,242,983 A | * | 9/1993 | Kennedy et al. ........ | 525/309 |
| 5,292,618 A | * | 3/1994 | Hagiwara et al. ....... | 430/280.1 |
| 5,536,621 A | * | 7/1996 | Mori et al. .............. | 430/284.1 |
| 5,643,977 A | * | 7/1997 | Sho et al. ............... | 523/411 |
| 5,724,110 A | * | 3/1998 | Majima .................. | 349/86 |

(Continued)

FOREIGN PATENT DOCUMENTS

| | | |
|---|---|---|
| JP | 2005-018022 | 1/2005 |
| JP | 2006-010870 | 1/2006 |
| KR | 2006-093627 A * | 9/2006 |

OTHER PUBLICATIONS

JPO Website Machine English Translation of Abstract, JP 04-033915, Kotou et al., Feb. 5, 1992.*

(Continued)

*Primary Examiner* — Sophie Hon
(74) *Attorney, Agent, or Firm* — Innovation Counsel LLP (57) ABSTRACT

A sealant that can be used in a liquid crystal display device without contaminating the liquid crystal layer is presented. The sealant includes an acrylic-based compound having at least two acryl groups per molecule and an epoxy-based compound having an epoxy group and a dihydrazide compound. A liquid crystal display using the sealant is provided. The liquid crystal display includes a first substrate having a display area, a second substrate on the first substrate and a liquid crystal layer interposed between the first and second substrates. A sealant pattern is formed on any one of the first and second substrates in an outer portion of the display area by using the sealant.

14 Claims, 8 Drawing Sheets
(1 of 8 Drawing Sheet(s) Filed in Color)

(56) References Cited

U.S. PATENT DOCUMENTS

| | | | |
|---|---|---|---|
| 6,656,979 B1* | 12/2003 | Kitano et al. | 522/100 |
| 6,803,423 B2* | 10/2004 | Hayakawa et al. | 525/298 |
| 6,964,999 B1* | 11/2005 | Nakagawa et al. | 525/193 |
| 7,521,100 B2* | 4/2009 | Imaizumi et al. | 428/1.53 |
| 2001/0020047 A1* | 9/2001 | Lau et al. | 522/33 |
| 2001/0024244 A1* | 9/2001 | Son | 349/43 |
| 2002/0013389 A1* | 1/2002 | Taylor et al. | 524/59 |
| 2002/0130995 A1* | 9/2002 | Nakanishi et al. | 349/112 |
| 2002/0181866 A1* | 12/2002 | Crook et al. | 385/37 |
| 2003/0158317 A1* | 8/2003 | Schaal et al. | 524/431 |
| 2004/0235992 A1* | 11/2004 | Okada et al. | 524/115 |
| 2006/0004140 A1* | 1/2006 | Asano et al. | 525/31 |
| 2006/0009579 A1* | 1/2006 | Miyawaki et al. | 525/31 |
| 2006/0162857 A1* | 7/2006 | Nagamoto et al. | 156/272.8 |

OTHER PUBLICATIONS

JPO Website Machine English Translation of JP 2005-060573, Ohashi, Mar. 10, 2005.*

JPO Website Machine English Translation of JP 2002-338900, Hasebe et al., Nov. 27, 2002.*

* cited by examiner

SEALANT AND LIQUID CRYSTAL DISPLAY USING THE SAME

CROSS-REFERENCE TO RELATED APPLICATION

This application relies for priority upon Korean Patent Application No. 2006-93627 filed on Sep. 26, 2006, the disclosure of which is incorporated herein by reference.

BACKGROUND

1. Field of Invention

The present invention relates to a sealant and a liquid crystal display using the same. More particularly, the present invention relates to a sealant capable of preventing the liquid crystal display from being contaminated by compositions included in the sealant and a liquid crystal display using the sealant.

2. Description of the Related Art

In general, display apparatuses that are currently widely used include liquid crystal display, plasma display, organic electroluminescence display, and the like. There are many different applications for a display apparatus, such as a TV or computer monitor and a cellular phone.

A display apparatus typically includes a pair of substrates facing each other. For example, the liquid crystal display includes two substrates facing each other and a liquid crystal layer interposed therebetween. An electric field is applied to the liquid crystal layer, and the alignment of the liquid crystals in the liquid crystal layer changes according to the electric field so that desired images are displayed.

A region where the image is displayed is defined as a display area. The display area usually includes a region near the center portions of the two substrates and does not include the peripheral portions of the two substrates. In the peripheral portion of the substrates, a sealant pattern is formed to combine the two substrates together.

The sealant pattern is formed using a compound including a polymer resin. However, upon combining the two substrates together, the compound included in the sealant pattern sometimes diffuses into the display area. As a result, the display area is contaminated, deteriorating the quality of image in the display apparatus.

SUMMARY OF THE INVENTION

The present invention provides a sealant that reduces the likelihood of a display area being contaminated.

The present invention also provides a liquid crystal display apparatus using the sealant. The liquid crystal display apparatus of the invention displays a high-quality image because there is no significant contamination of the liquid crystal layer.

In one aspect, the invention is a sealant that includes an acrylic-based compound having at least two acryl groups per molecule, an epoxy-based compound having an epoxy group and a dihydrazide compound.

In another aspect, the invention is a liquid crystal display that includes a first substrate, a second substrate, a liquid crystal layer and a sealant pattern. The first substrate has a display area thereon. The second substrate is on the first substrate. The liquid crystal layer is interposed between the first and second substrates. The sealant pattern is formed on at least one of the first and second substrates in an outer portion of the display area so as to combine the first and second substrates, and includes an acrylic-based compound having at least two acryl groups per molecule.

The acrylic-based compound may include one or more of the compounds having chemical formulas 1 through 4 shown below:

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

The above and other advantages of the present invention will become readily apparent by reference to the following detailed description when considered in conjunction with the accompanying drawings wherein.

DESCRIPTION OF THE EMBODIMENTS

Hereinafter, embodiments the present invention will be explained in detail with reference to the accompanying drawings. However, the scope of the present invention is not limited to such embodiments and the present invention may be realized in various forms. The embodiments to be described below are provided to thoroughly disclose the present invention and assist those skilled in the art to understand the present invention. The present invention is defined only by the scope of the appended claims. In addition, the size of regions shown in the drawings may be simplified or magnified for the purpose of clear explanation. The same reference numerals are used to designate the same elements throughout the drawings.

Figure 1:
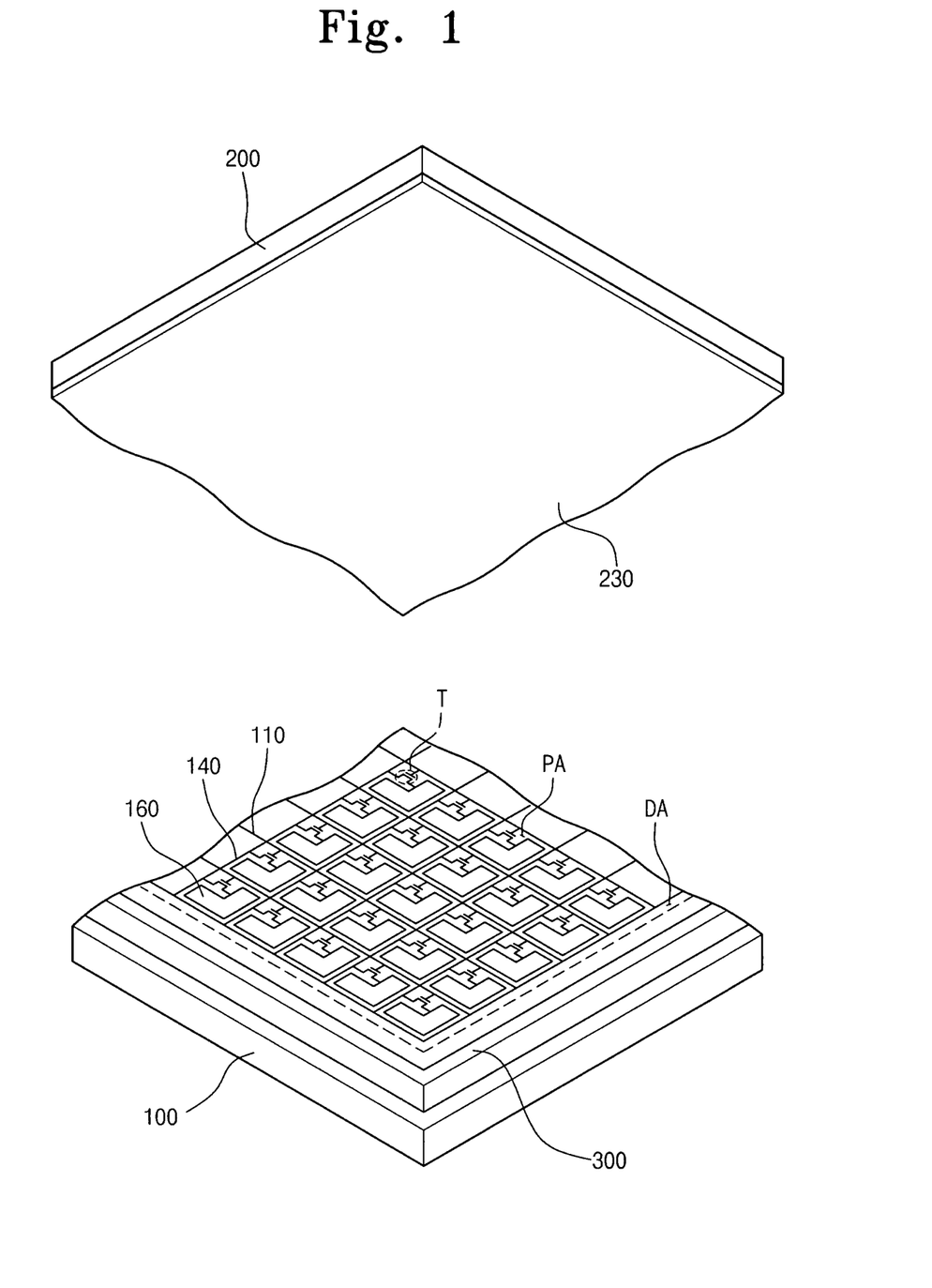
FIG. 1 is an exploded perspective view of a liquid crystal display according to an embodiment of the present invention.

FIG. 1 is an exploded perspective view of a liquid crystal display according to an embodiment of the present invention.

Referring to FIG. 1, the liquid crystal display includes a first substrate 100 and a second substrate 200 facing the first substrate 100, and a liquid crystal layer (not shown) containing liquid crystals interposed between the first and second substrates 100 and 200. A display area DA displaying an image is defined on the first substrate 100. The display area DA includes the center portion of the first substrate 100 but not the peripheral portion of the first substrate 100.

In an outer portion of the display area DA, a sealant pattern 300 is formed along the peripheral portion of the first substrate 100. Alternatively, the sealant pattern 300 can be formed on the second substrate 200 corresponding to the outer portion of the display area DA.

A plurality of gate lines and data lines are formed on the first substrate 100 in an inner portion of the display area DA. The gate lines and the data lines cross each other, so that one gate line 110 and one data line 140 define a pixel area PA. On pixel area PA, a pixel electrode 160 and a thin film transistor T are provided.

Figure 2:
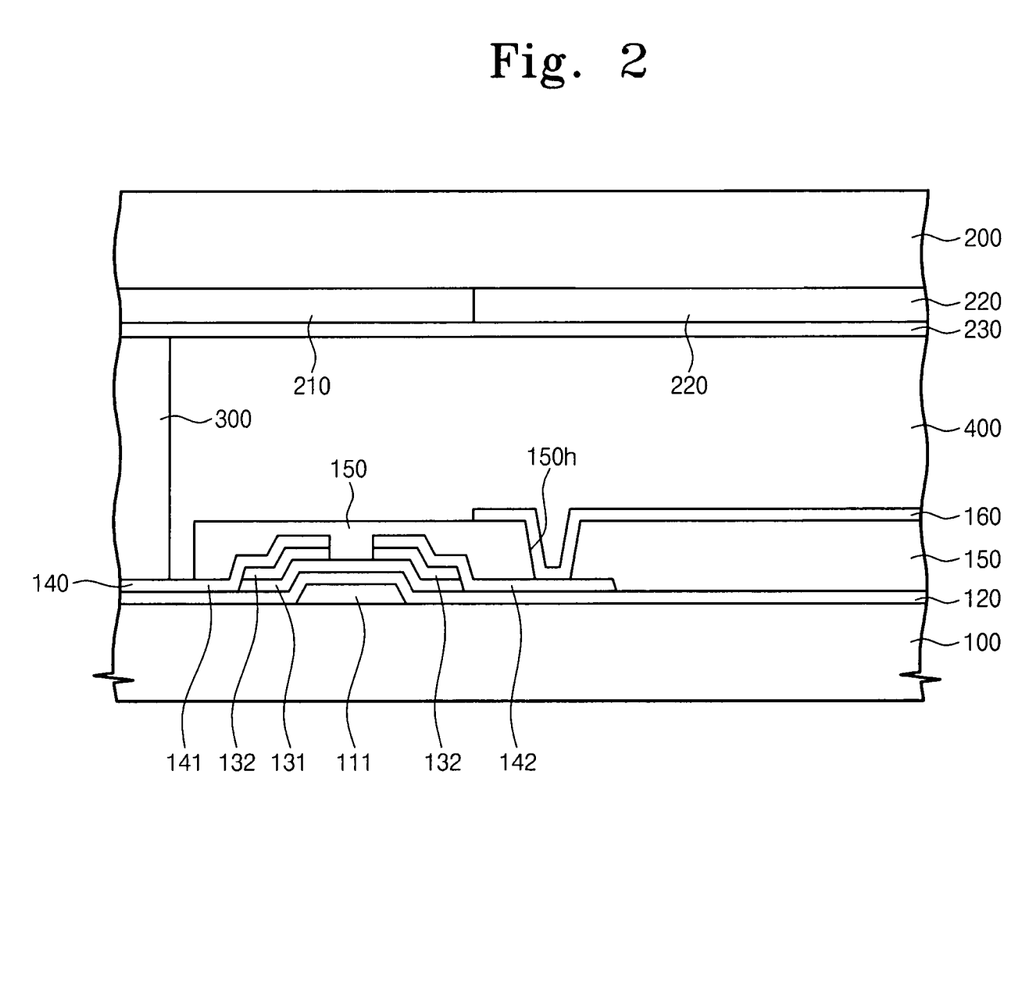
FIG. 2 is a sectional view illustrating a boundary portion of a display area of a liquid crystal display shown in FIG. 1.

FIG. 2 is a sectional view showing the combined first and second substrates shown in FIG. 1.

Referring to FIG. 2, the first and second substrates 100 and 200 are coupled while being spaced apart from each other by a predetermined distance by means of the sealant pattern 300. A liquid crystal layer 400, in which liquid crystal molecules are aligned, is interposed in the space between the first and second substrates 100 and 200. The thin film transistor 'T' includes a gate electrode 111, a semiconductor pattern 131, an ohmic contact pattern 132, a source electrode 141 and a drain electrode 142. The gate electrode 111 is connected to the gate line 110. The gate electrode 111 is covered by a gate insulating layer 120. The semiconductor pattern 131 and the ohmic contact pattern 132 are formed on the gate insulating layer 120 while overlapping the gate electrode 111. The ohmic contact pattern 132 is divided into two separate parts, and the source electrode 141 and the drain electrode 142 are formed on the two parts of the ohmic contact pattern 132, respectively, while being positioned across the gate electrode 111 from each other. The source electrode 141 is connected to the data line 140.

The thin film transistor T is covered by a passivation layer 150 having a contact hole 150h. The pixel electrode 160, which is electrically connected with the drain electrode 142 through the contact hole 150h, is formed on the passivation layer 150.

The second substrate 200 includes a light blocking layer pattern 210, a color filter 220 and a common electrode 230. The light blocking layer pattern 210 is initially deposited on a larger area but is partially removed from the region corresponding to the pixel area PA. The color filter 220 fills the portion where the light blocking layer pattern 210 is removed. The common electrode 230 facing the pixel electrode 160 is formed on the color filter 220.

During the operation of the liquid crystal display, a gate signal is applied to the gate line 110, turning on the thin film transistor T. A data signal corresponding to image information is transmitted through the data line 140, so that a data voltage corresponding to the data signal is applied to the pixel electrode 160. A common voltage is applied to the common electrode 230. Due to the voltage difference between the pixel electrode 160 and the common electrode 230, an electric field is established to be applied to the liquid crystal layer 400. The alignment of the liquid crystal molecules changes in response to the electric field. In general, a light transmittance of the liquid crystal varies according to the alignment of the liquid crystal. Thus, the desired image can be displayed by controlling the light passing through the liquid crystal layer through the liquid crystal alignment.

During operation, since the liquid crystal display displays the image by using the light passing through the liquid crystal, contamination of the liquid crystal deteriorates the quality of the image. The liquid crystal can be contaminated by the sealant pattern 300. The sealant pattern 300 includes a compound for coupling the first and second substrates 100 and 200, and compositions included in the compound diffuse into the liquid crystal layer 400, contaminating the liquid crystal.

The sealant pattern 300 according to the present embodiment includes a sealant having compositions described below to prevent the liquid crystal from being contaminated. The sealant includes an acrylic-based compound, an epoxy-based compound and a dihydrazide compound.

The acrylic-based compound includes at least two acryl groups per-molecule. Particularly, the acrylic-based compound includes any one of compounds having chemical formulas 1 through 4 as follows. In addition, the acrylic-based compound may include two compounds or more having the chemical formulas 1 through 4.

<Chemical Formula 1>

R: hydrocarbon

In a compound of chemical formula 1, two first compounds are bonded to the central hydrocarbon. The hydrocarbon may have two hydrogens bonded to the carbon, and the first compound has the acryl group bonded to its terminal end. Therefore, the compound of chemical formula 1 has two acryl groups per molecule.

<Chemical formula 2>

R: hydrocarbon

In a compound of chemical formula 2, three second compounds are bonded to the central hydrocarbon. The hydrocarbon may have one hydrogen bonded to the carbon, and the second compound has the acryl group bonded to its terminal end. Therefore, the compound of chemical formula 2 has three acryl groups per molecule.

<Chemical formula 3>

R: hydrocarbon

In a compound of chemical formula 3, four third compounds are bonded to the central hydrocarbon. The third compound has the acryl group bonded to its terminal end. Therefore, the compound of chemical formula 3 has four acryl groups per molecule.

<Chemical formula 4> n: positive integer
R: hydrocarbon

In a compound of chemical formula 4, four fourth compounds are bonded to the central hydrocarbon. The fourth compound has the acryl group bonded to its terminal end. Therefore, the compound of chemical formula 4 has four acryl groups per molecule.

In chemical formulas 1 through 4, the compound positioned at the center is not limited to a hydrocarbon, but may include other elastic segments capable of sharing electrons.

The acrylic-based compound including the compounds of chemical formulas 1 through 4 has two characteristics, which will now be described.

The acrylic-based compound is cured by irradiation with light, such as ultraviolet light. The curing efficiency can be improved because the acrylic-based compound has at least two acryl groups per molecule. That is, if the acrylic-based compound has at least two acryl groups per molecule, the bonding force between the molecules is strengthened, so that the molecules can be strongly bonded to each other. Therefore, most molecules are cured with irradiation, and the ratio of non-cured molecules to the cured molecules is very low.

The non-cured molecules have a fluidity that allows them to easily diffuse into and contaminate the liquid crystal layer 400. However, according to the present invention, since the ratio of the non-cured molecules is small, the chances of the liquid crystal layer being contaminated is lowered.

In addition, the acrylic-based compound includes a plurality of acryl groups that increase the compound's molecular weight the increased molecular weight results in decreased fluidity. Thus, even if the acrylic-based compound is not cured during irradiation, the diffusion of the acrylic-based compound into the liquid crystal layer 400 is restricted by the molecular weight/size of the compound. Accordingly, the chances of the liquid crystal layer being contaminated is reduced. Particularly, the liquid crystal can be prevented from being contaminated when the acrylic-based compound has a molecular weight in a range of about 100,000 to about 500,000. Molecular weight can be adjusted by controlling the process conditions, such as the amount of the reactant, the reaction pressure, and the reaction temperature.

For the acrylic-based compound to be cured by irradiation with light, the sealant further includes a photopolymerization initiator. The photopolymerization initiator can be classified into two types: an ion type photopolymerization initiator and a radical type photopolymerization initiator, and both of these types can be employed as the photopolymerization initiator. However, in the case of ion type photopolymerization initiator, because ions can be eluted to the liquid crystal layer during the curing process using light, the radical type photopolymerization initiator is preferred. Benzylmethylketal or benzophenone initiator or carbazole initiator may be employed as the radical type photopolymerization initiator.

The sealant may further include an epoxy-based compound. The epoxy-based compound is cured by the heat to form a steric mesh structure. Therefore, the sealant includes a photo-curing composition of the acrylic-based compound and a thermosetting composition of the epoxy-based compound.

As shown in FIGS. 1 and 2, the first and second substrates 100 and 200 include elements such as the gate line 110, the data line 140 and the light blocking layer pattern 210, which include materials blocking the light. If the light is blocked by such elements, some portions of the sealant pattern 300 are not irradiated and thus, these portions cannot be cured. In order to compensate for the non-cured portions, the sealant may further include a thermosetting composition besides the photo-curing composition. In addition, since the thermosetting composition represents superior strength after the curing as compared to that of the photo-curing composition, the thermosetting composition is preferably added to the sealant to enhance the strength. Any epoxy-based compound may be employed so long as the compound has at least one epoxy group per molecule. For instance, novolak-type epoxy resin, glycidylether of polyhydric phenol and glycidylether of polyhydric alcohol can be employed as the epoxy-based compound. The novolak-type epoxy resin includes phenol novolak resin such as phenol or cresol, or phenol novolak resin containing xylylene backbone. The glycidylether of polyhydric phenol includes resorcinoldiglycidylether. The glycidylether of polyhydric alcohol includes polypropyleneglycoldiglycidylether.

As describe above, the acrylic-based compound has multiple acryl groups and an increased molecular weight that lowers its chances of contaminating the liquid crystal layer. The epoxy-based compound is used as a supplement for enhancing the strength of the sealant. Thus, the acrylic-based compound has a greater weight proportion than the epoxy-based compound in the sealant. Preferably, the acrylic-based compound in the sealant has the weight ratio in the range from more than 50% to 90% or less.

The sealant further includes the dihydrazide compound. The dihydrazide compound is combined with the epoxy-based compound at a predetermined ratio, and has a low melting point in the range from about 110° C. to about 130° C. The dihydrazide compound reacts with the epoxy-based compound and becomes cured when treated with heat, and since the melting point of the dihydrazide compound is low, the dihydrazide compound has advantages as described below.

Figure 3:
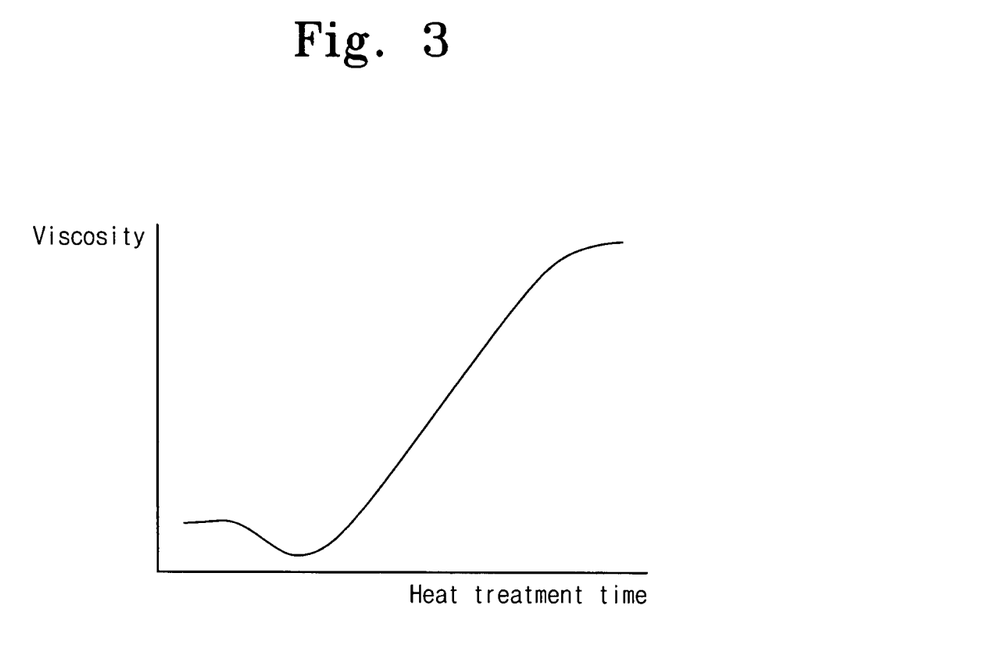
FIG. 3 is a schematic graph showing the viscosity change of a sealant pattern according to heat treatment time.

FIG. 3 is a schematic graph showing the viscosity change of the sealant pattern according to the length of heat treatment.

As can be seen from FIG. 3, when the heat treatment starts, the viscosity of the sealant pattern initially decreases for a predetermined time, and then increases. If the viscosity of the sealant pattern is low, the compound included in the sealant pattern flows into the liquid crystal to contaminate the liquid crystal. Therefore, the liquid crystal may be easily contaminated by the sealant pattern during the begining of the heat treatment process.

However, because the dihydrazide compound included in the sealant according to the present embodiment has a low melting point, the dihydrazide compound rapidly reacts during the initial heat treatment period to prevent the liquid crystal from being contaminated.

The dihydrazide compound satisfying the above-mentioned conditions may include, for example, 4-isopropyl-2,5-dioxoimidazolidine-1,3-di(propionohydrazide) having a chemical formula 5 as follows.

<Chemical formula 5>

Figure 4A:
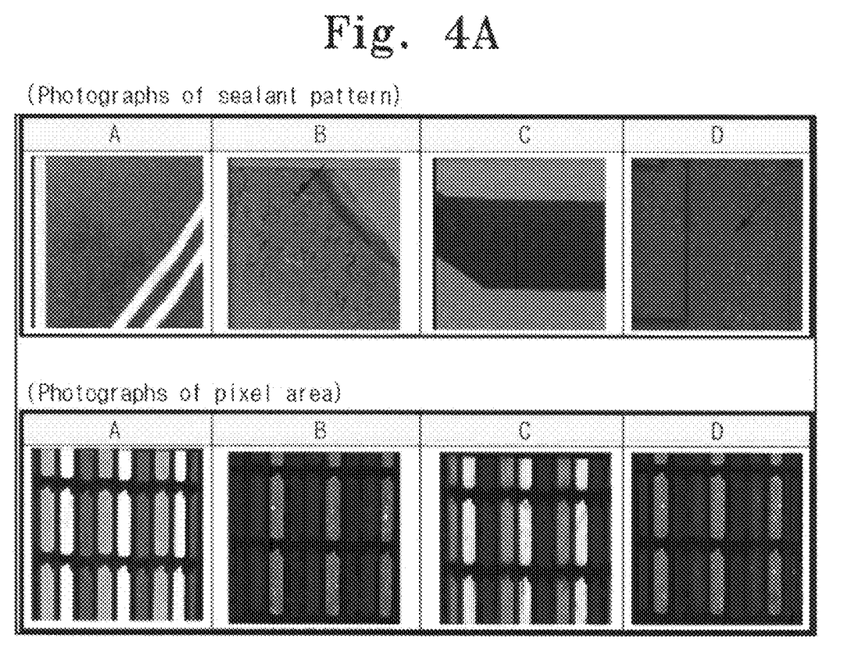
FIG. 4A is an enlarged photographic view showing portions of a liquid crystal display according to a comparative example.

FIG. 4A is an enlarged photographic view showing portions of a liquid crystal display according to a comparative example.

FIG. 4A shows an enlarged peripheral boundary portion of the display area after a sealant pattern is formed in the liquid crystal display using a conventional sealant. The peripheral portion includes an upper right portion A, a lower right portion B, an upper left portion C and a lower left portion D.

Referring to the photographic view of the sealant pattern shown in FIG. 4A, contaminants (indicated by arrow) that did not get cured by irradiation are eluted at the lower right portion B and the lower left portion D.

Referring to the photographic view of the pixel area shown in FIG. 4A, the image quality at the lower right portion B and the lower left portion D is deteriorated by the eluted contaminants.

Figure 4B:
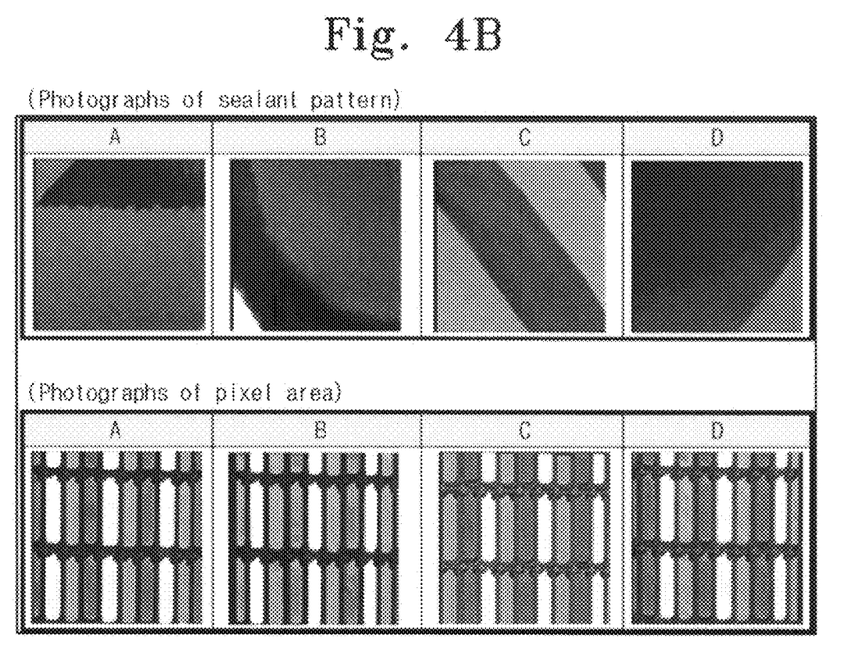
FIG. 4B is an enlarged photographic view showing portions of a liquid crystal display according to an embodiment of the present invention.

FIG. 4B is an enlarged photographic view showing portions of the liquid crystal display according to the embodiment of the present invention.

FIG. 4B shows the enlarged peripheral boundary portion of the display area after forming the sealant pattern using the sealant according to the embodiment of the present invention in the liquid crystal display.

Referring to the photographic view of the sealant pattern shown in FIG. 4B, the contaminants that did not get cured during irradiation are not eluted to anywhere at the upper right portion A, the lower right portion B, the upper left portion C or the lower left portion D. Accordingly, as shown in the photographic view of the pixel area shown in FIG. 4B, the pixel area has a high-quality image.

Hereinafter, the manufacturing procedure for the liquid crystal display by using the sealant according to the invention will be described.

FIGS. 5A through 5E are views showing the manufacturing procedure for the liquid crystal display shown in FIG. 1.

Figure 5A:
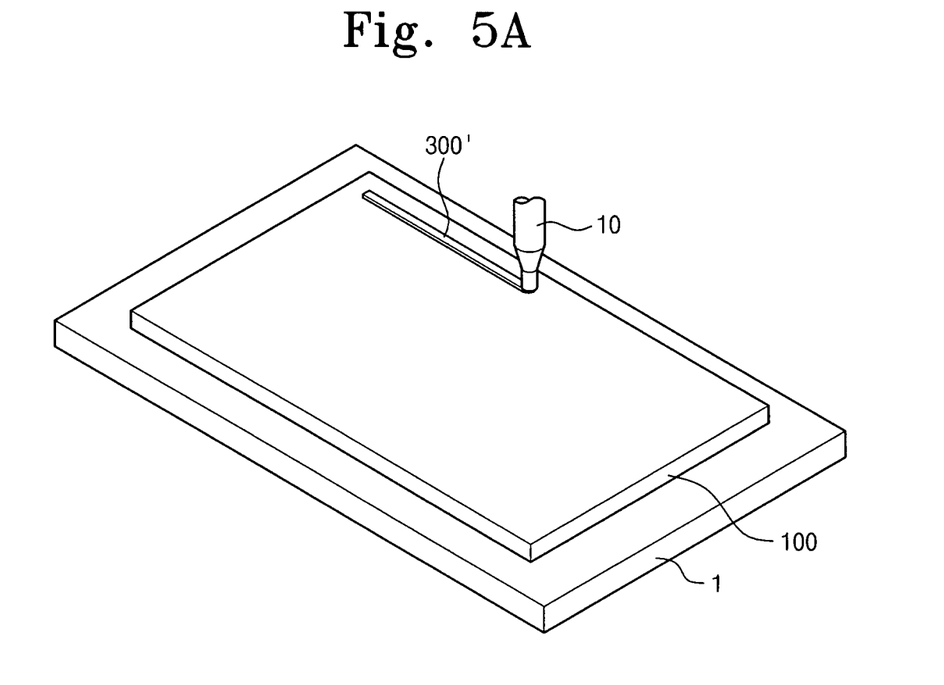
FIGS. 5A through 5E are views showing the manufacturing procedure for a liquid crystal display shown in FIG. 1.

Referring to FIG. 5A, a first substrate 100 is placed on a stage 1. A first dispenser 10 is disposed while being spaced apart from the first substrate 100. The first dispenser 10 is supplied with a sealant 300' from a feeder, and supplies the sealant 300' to the first substrate 100 while moving along the peripheral portion of the first substrate 100. The sealant 300' includes an acrylic-based compound having at least two acryl groups per molecule. In addition, the sealant 300' can further include an epoxy-based compound having epoxy groups and a dihydrazide compound.

Figure 5B:
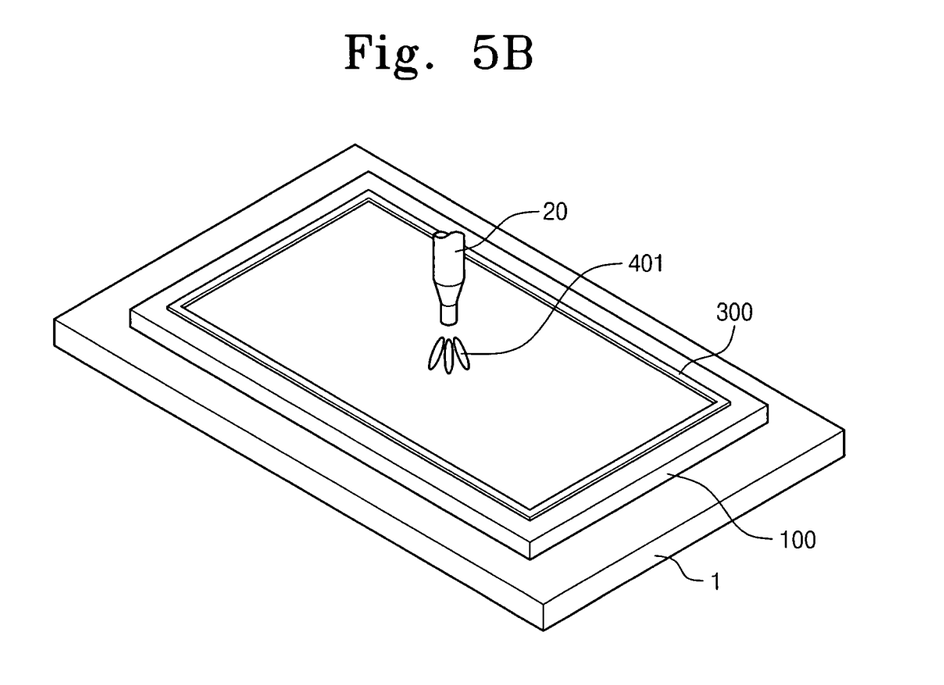

Referring to FIG. 5B, a sealant pattern 300 is formed by the sealant 300' supplied along the peripheral portion of the first substrate 100. A second dispenser 20 is disposed while being spaced apart from the first substrate 100. The second dispenser 20 is supplied with liquid crystal molecules 401 from a feeder, and supplies the liquid crystal molecules 401 to the first substrate 100. The liquid crystal 401 is injected into an inner area surrounded by the sealant pattern 300.

Figure 5C:
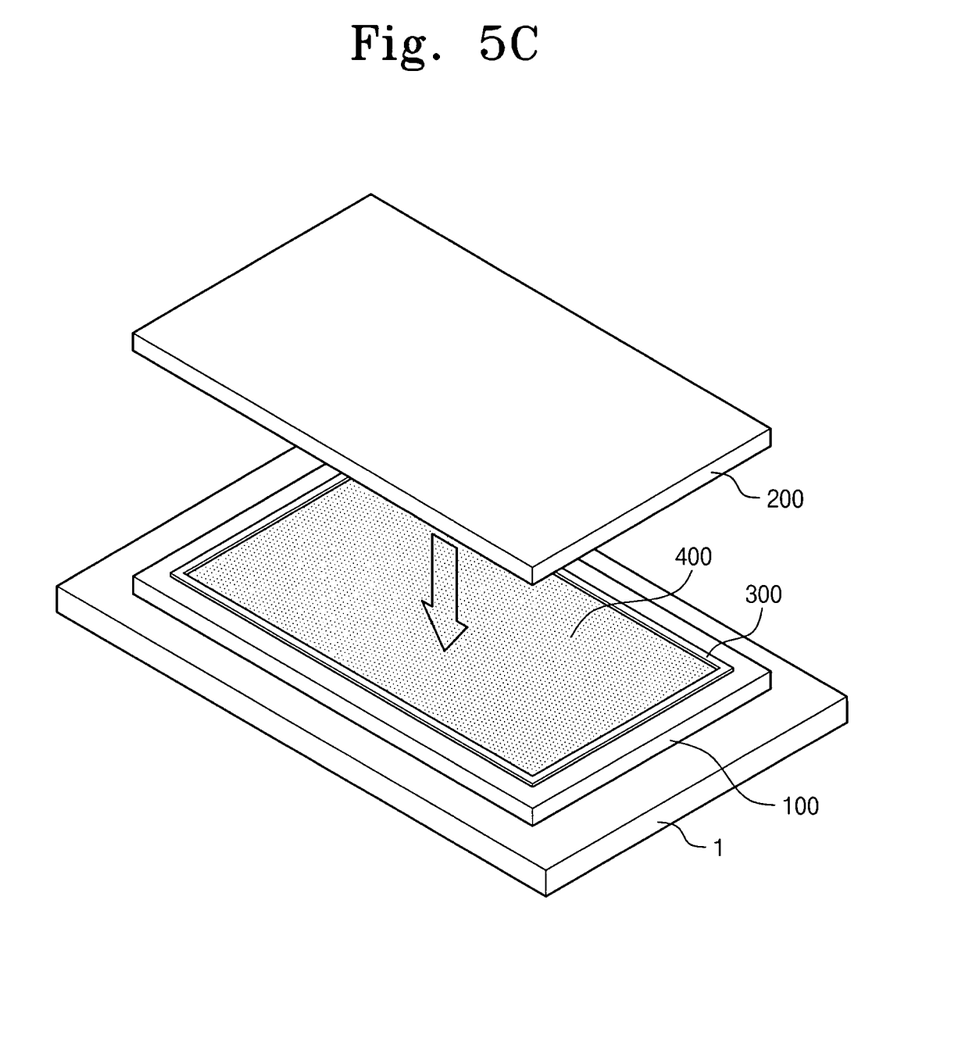

Referring to FIG. 5C, a second substrate 200 is disposed on the first substrate 100. A space having the height of the sealant pattern 300 is formed between the first and second substrates 100 and 200. The space is filled with the liquid crystal molecules 401, thereby forming a liquid crystal layer 400.

Figure 5D:
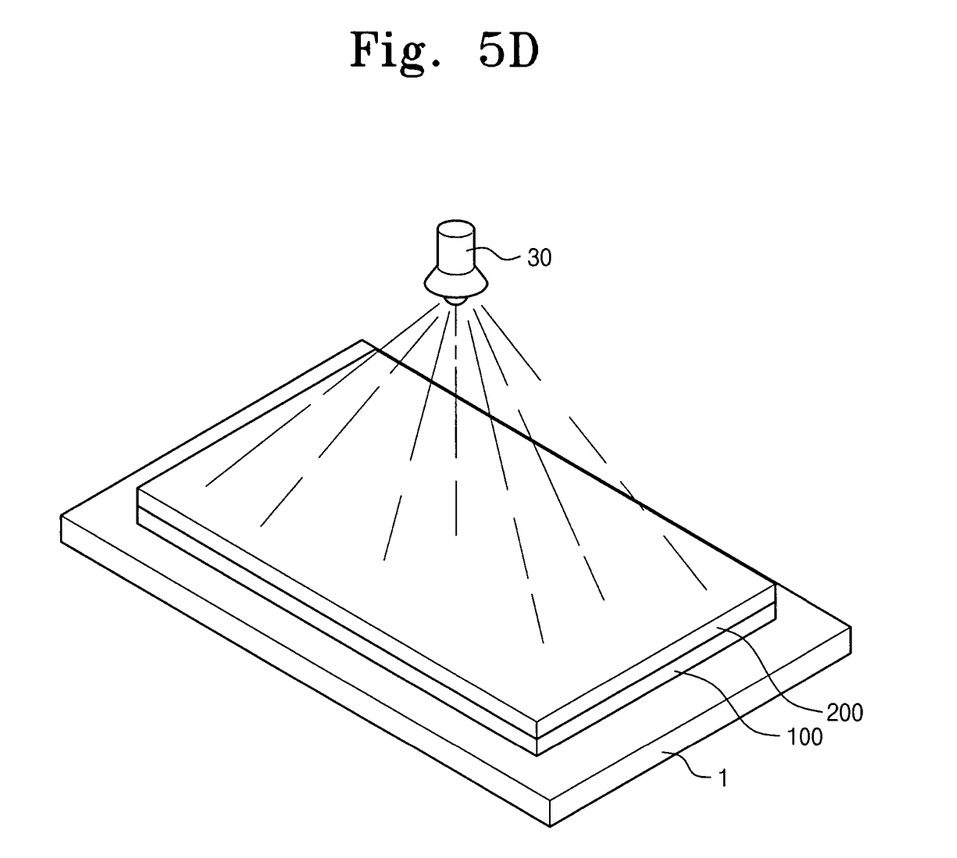

Referring to FIG. 5D, a light source 30 is provided above a top surface of the second substrate 200 to irradiate the first and second substrates 100 and 200. The sealant pattern 300 includes the acrylic-based compound having acryl groups, and the acrylic-based compound reacts with light to be cured. The acrylic-based compound includes compounds having the chemical formulas 1 to 4 shown above. Most of the acrylic-based compound is cured by the light, so that the curing efficiency by the light is high. As a result, the chances of the liquid crystal layer 400 being contaminated by non-cured materials during the curing process is low.

Figure 5E:
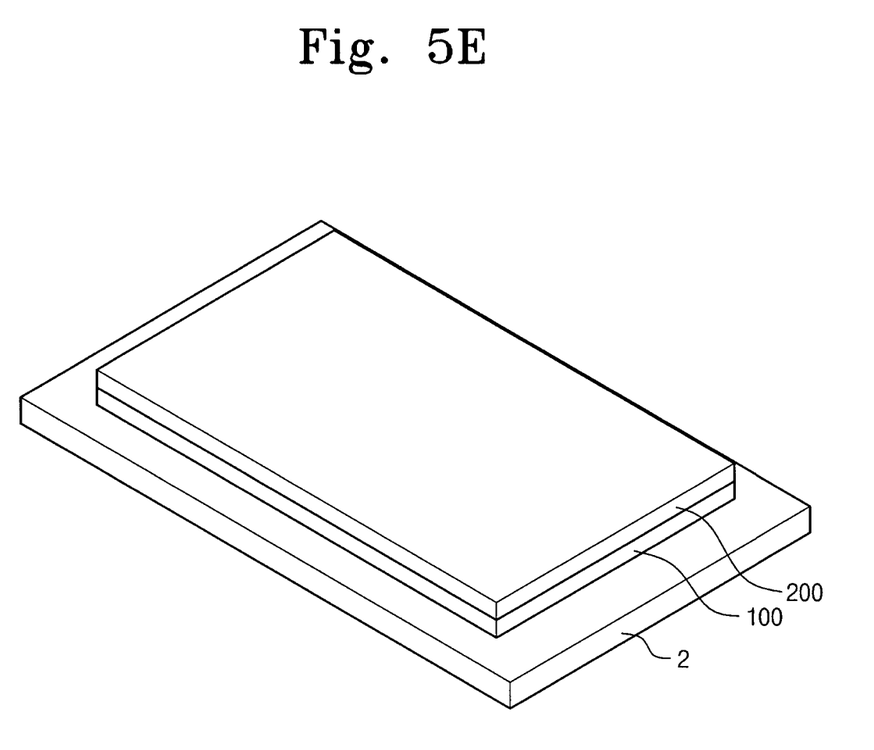

Referring to FIG. 5E, the first and second substrates 100 and 200 are disposed on a hot plate 2. The first and second substrates 100 and 200 are supplied with heat from the hot plate 2 to undergo heat treatment. The sealant pattern 300 includes the epoxy-based compound having an epoxy group, and the epoxy-based compound is cured by the heat treatment. In addition, the sealant pattern 300 includes the dihydrazide compound having the chemical formula 5 shown above, and the dihydrazide compound promotes the curing. As a result, the chances of the liquid crystal layer 400 being contaminated by non-cured materials during the heat treatment process is lowered.

Although exemplary embodiments of the present invention have been described, it is understood that the present invention should not be limited to these exemplary embodiments and various changes and modifications can be made by one ordinary skilled in the art within the spirit and scope of the present invention as hereinafter claimed.

As described above, with the sealant of the present invention, the curing efficiency is improved in the curing process so that the liquid crystal is prevented from being contaminated. In addition, according to the liquid crystal display of the present invention, the sealant pattern is formed by using the sealant such the liquid crystal molecules can be prevented from being contaminated by the sealant pattern, thereby allowing the liquid crystal display to have the high-quality image.

What is claimed is:

1. A sealant comprising:
   an acrylic-based compound comprising at least two acryl groups per molecule; and
   an epoxy-based compound comprising an epoxy group;
   wherein the acrylic-based compound comprises a compound having a molecular weight in a range of about 100,000 to about 500,000 and a chemical formula 4:

<Chemical formula 4> n: positive integer
R: hydrocarbon wherein n is equal to or greater than 1.

2. The sealant of claim 1, wherein the sealant further comprises a compound having a chemical formula 1:

<Chemical formula 1>

R: hydrocarbon

3. The sealant of claim 1, wherein the sealant further comprises a compound having a chemical formula 3:

<Chemical formula 3>

R: hydrocarbon

4. The sealant of claim 1, further comprising a dihydrazide compound comprising 4-isopropyl-2,5-dioxoimidazolidine-1,3-di(propionohydrazide) having a chemical formula 5:

<Chemical formula 5>

5. The sealant of claim 4, wherein the dihydrazide compound has a melting point in a range of about 110° C. to about 130° C.

6. The sealant of claim 1, wherein a weight ratio of the acrylic-based compound to epoxy-based compound is about 1:1 to about 9:1.

7. A liquid crystal display comprising:
a first substrate that has a display area and includes a data line thereon;
a second substrate on the first substrate and including a common electrode;
a liquid crystal layer interposed between the first and second substrates; and
a sealant pattern formed on at least one of the first and second substrates between the data line and the common electrode in an outer portion of the display area so as to combine the first and second substrates, and including an acrylic-based compound,
wherein the acrylic-based compound comprises a compound having a molecular weight in a range of about 100,000 to about 500,000, and a chemical formula 4:

<Chemical formula 4> n: positive integer
R: hydrocarbon wherein n is equal to or greater than 1.

8. The liquid crystal display of claim 7, wherein the acrylic-based compound further comprises a compound having a chemical formula 1:

<Chemical formula 1>

R: hydrocarbon

9. The liquid crystal display of claim 7, wherein the acrylic-based compound further comprises a compound having a chemical formula 2:

<Chemical formula 2>

R: hydrocarbon

10. The liquid crystal display of claim 7, wherein the acrylic-based compound further comprises a compound having a chemical formula 3:

<Chemical formula 3>

R: hydrocarbon

11. The liquid crystal display of claim 7, wherein the sealant pattern further comprises:
an epoxy-based compound comprising an epoxy group; and
a dihydrazide compound.

12. The liquid crystal display of claim 11, wherein the dihydrazide compound comprises 4-isopropyl-2,5-dioxoimidazolidine-1,3-di(propionohydrazide) having a chemical formula 5:

<Chemical formula 5>

13. The liquid crystal display of claim 11, wherein the dihydrazide compound has a melting point in a range of about 110° C. to about 130° C.

14. The liquid crystal display of claim 11, wherein a weight ratio of the acrylic-based compound to epoxy-based compound is about 1:1 to about 9:1.

* * * * *